US008604929B1

(12) United States Patent
Yadav-Ranjan

(10) Patent No.: US 8,604,929 B1
(45) Date of Patent: Dec. 10, 2013

(54) PERSONAL ALERT SYSTEM AND METHOD

(75) Inventor: Rani Yadav-Ranjan, San Jose, CA (US)

(73) Assignee: Navigator Technology, Inc., Fremont, CA (US)

( * ) Notice: Subject to any disclaimer, the term of this patent is extended or adjusted under 35 U.S.C. 154(b) by 639 days.

(21) Appl. No.: 12/768,596

(22) Filed: Apr. 27, 2010

Related U.S. Application Data

(60) Provisional application No. 61/172,938, filed on Apr. 27, 2009.

(51) Int. Cl.
*G08B 23/00* (2006.01)

(52) U.S. Cl.
USPC .................................... 340/573.1; 455/414.2

(58) Field of Classification Search
USPC .......... 340/573.1; 455/414.1, 414.2, 418, 419
See application file for complete search history.

(56) References Cited

U.S. PATENT DOCUMENTS 7,181,493 B2 * 2/2007 English et al. ................ 709/204
7,920,851 B2 * 4/2011 Moshir et al. ............. 455/414.2

* cited by examiner

*Primary Examiner* — John A Tweel, Jr.
(74) *Attorney, Agent, or Firm* — Maryam Imam; IPxLaw Group LLP

(57) ABSTRACT

A personal alert system and method are provided. The personal alert system may generate, for example, residence alerts, school alerts, finance alerts and/or public persona alerts.

16 Claims, 12 Drawing Sheets

52

Neighbors

| Owner | Donor | Arrest Record | Sex Offenders | Address | Foreclosure |
| --- | --- | --- | --- | --- | --- |
| Unlisted | No | No | No | 2000 UNIVERSITY AVENUE PALO ALTO, CA | N |
| Unlisted | No | No | No | 2010 UNIVERSITY AVENUE PALO ALTO, CA | N |

FIGURE 3

| Home Crimes | 6 Thefts<br>0 Assaults<br>0 Homicide<br>0 Other |
|---|---|
| College Crimes | 13 Thefts<br>3 Assaults<br>0 Homicide<br>7 Other |
| Offenders | 69 Offenders in your neighborhood |
| College Offenders | 124 Offenders in your college neighborhood |
| Amber Alerts | 25 |
| Personal Finance Tracking | # of Transactions<br># of Deposits<br># of Withdrawls<br># of Checks written<br># of ATM transactions<br># of Overdrawn's |
| Liens and Judgements | 0 |
| USPS Address Change Request | Available Soon |
| DMV Address Change Request | Available Soon |
| Email Alerts Sent Today | Available Soon |
| Teacher Monitoring | Available Soon |
| Weather watch | 61F, Sunny |

FIGURE 6

Figure 7:
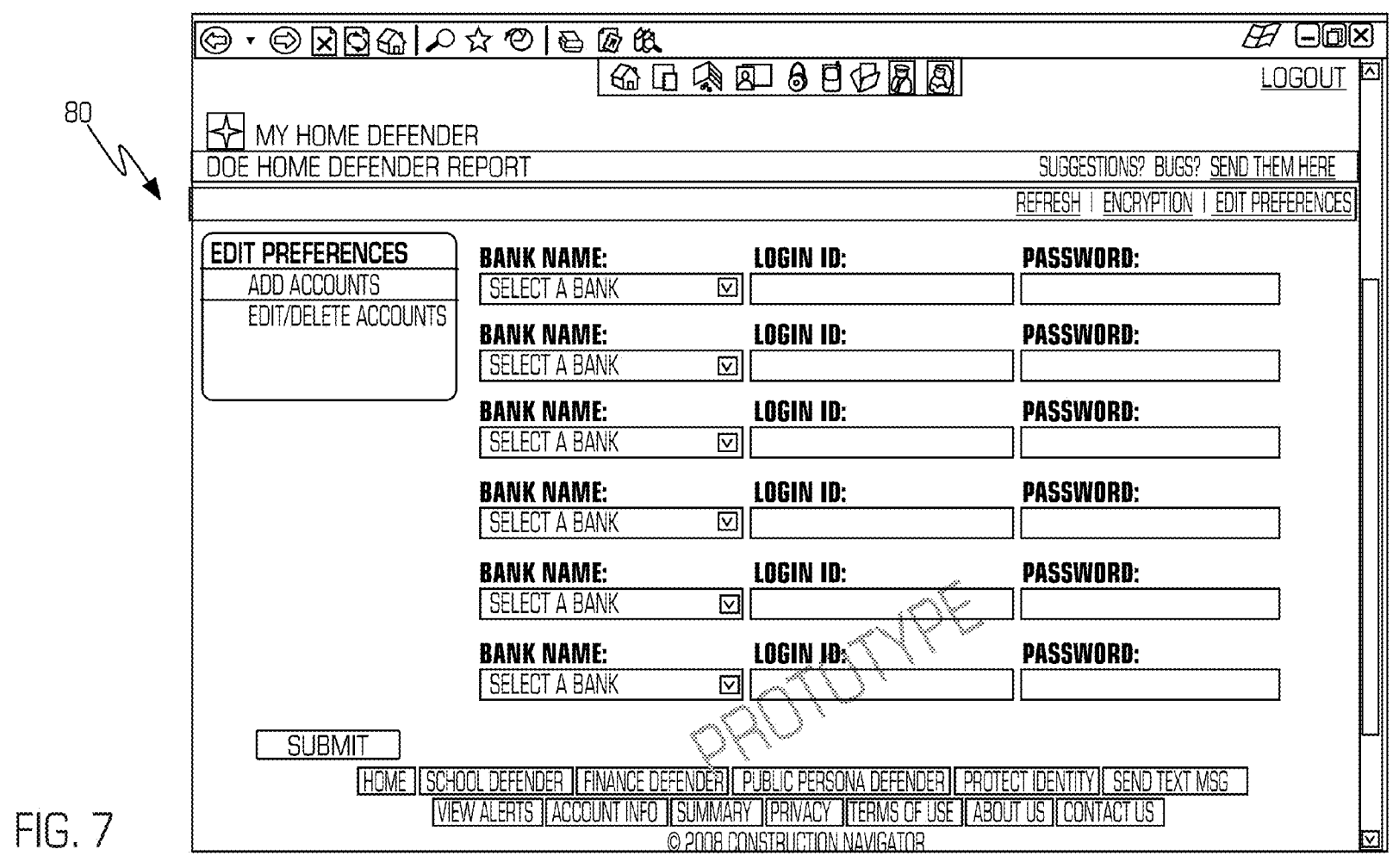

MY HOME DEFENDER

DOE HOME DEFENDER REPORT

LOGOUT

SUGGESTIONS? BUGS? SEND THEM HERE

REFRESH | ENCRYPTION | EDIT PREFERENCES

EDIT PREFERENCES
ADD ACCOUNTS
EDIT/DELETE ACCOUNTS

BANK NAME: SELECT A BANK LOGIN ID: PASSWORD:

BANK NAME: SELECT A BANK LOGIN ID: PASSWORD:

BANK NAME: SELECT A BANK LOGIN ID: PASSWORD:

BANK NAME: SELECT A BANK LOGIN ID: PASSWORD:

BANK NAME: SELECT A BANK LOGIN ID: PASSWORD:

BANK NAME: SELECT A BANK LOGIN ID: PASSWORD:

PROTOTYPE

SUBMIT

HOME | SCHOOL DEFENDER | FINANCE DEFENDER | PUBLIC PERSONA DEFENDER | PROTECT IDENTITY | SEND TEXT MSG

VIEW ALERTS | ACCOUNT INFO | SUMMARY | PRIVACY | TERMS OF USE | ABOUT US | CONTACT US

© 2008 CONSTRUCTION NAVIGATOR

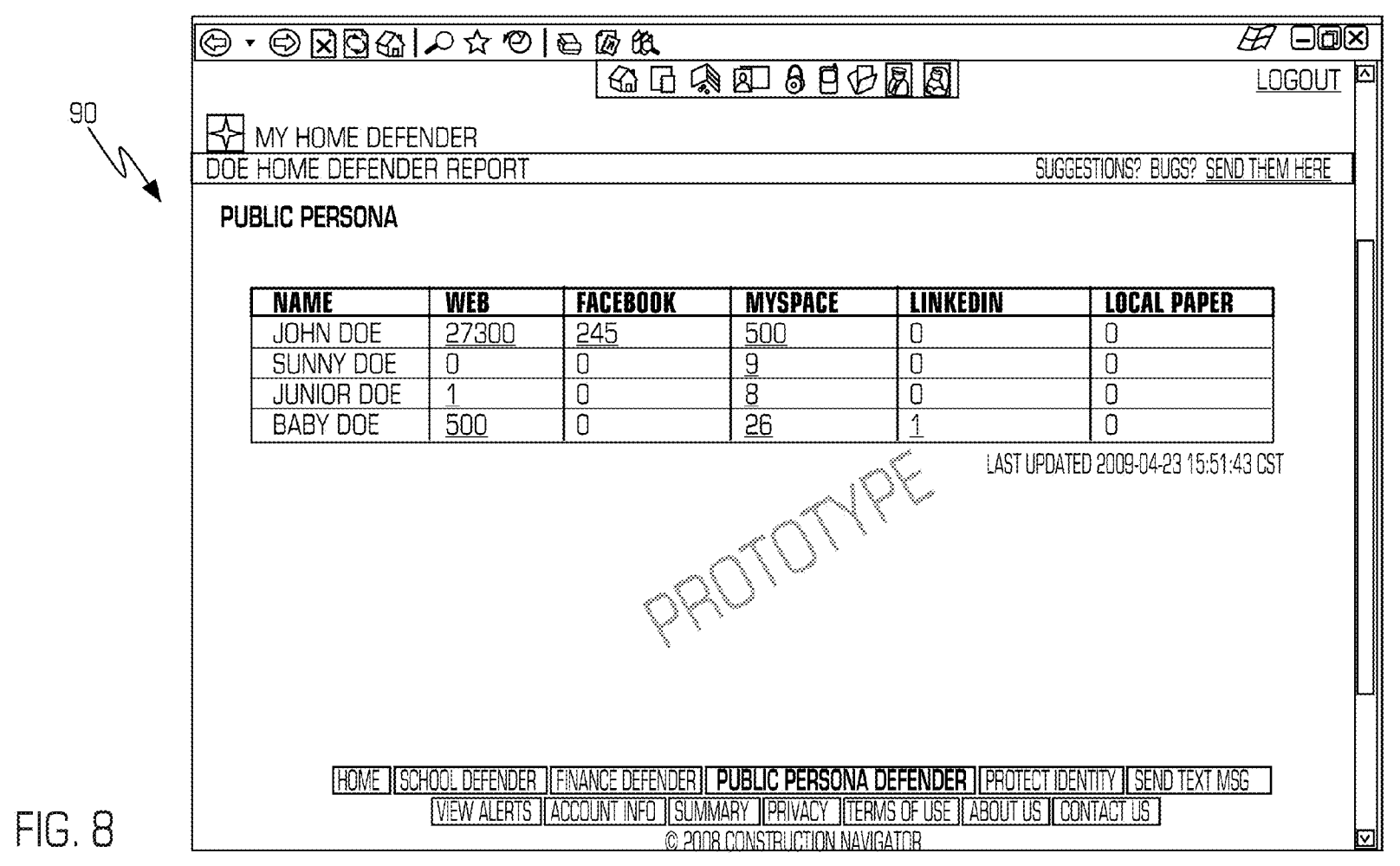

| NAME | WEB | FACEBOOK | MYSPACE | LINKEDIN | LOCAL PAPER |
|---|---|---|---|---|---|
| JOHN DOE | 27300 | 245 | 500 | 0 | 0 |
| SUNNY DOE | 0 | 0 | 9 | 0 | 0 |
| JUNIOR DOE | 1 | 0 | 8 | 0 | 0 |
| BABY DOE | 500 | 0 | 26 | 1 | 0 |

FIG. 8

Figure 9:
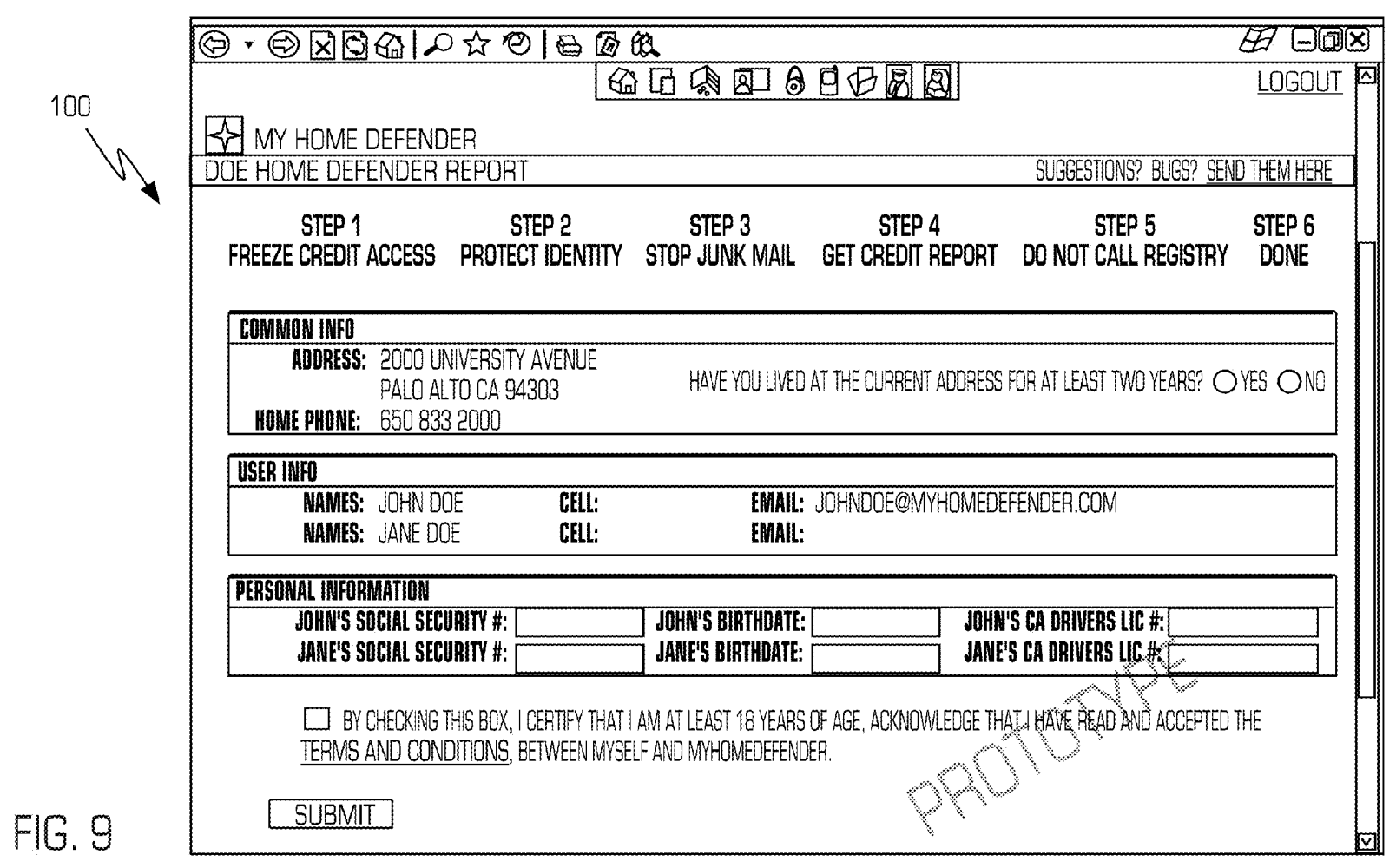

MY HOME DEFENDER

DOE HOME DEFENDER REPORT

LOGOUT

SUGGESTIONS? BUGS? SEND THEM HERE

STEP 1 FREEZE CREDIT ACCESS
STEP 2 PROTECT IDENTITY
STEP 3 STOP JUNK MAIL
STEP 4 GET CREDIT REPORT
STEP 5 DO NOT CALL REGISTRY
STEP 6 DONE

COMMON INFO

ADDRESS: 2000 UNIVERSITY AVENUE
PALO ALTO CA 94303

HOME PHONE: 650 833 2000

HAVE YOU LIVED AT THE CURRENT ADDRESS FOR AT LEAST TWO YEARS? ○ YES ○ NO

USER INFO

NAMES: JOHN DOE CELL: EMAIL: JOHNDOE@MYHOMEDEFENDER.COM
NAMES: JANE DOE CELL: EMAIL:

PERSONAL INFORMATION

JOHN'S SOCIAL SECURITY #: JOHN'S BIRTHDATE: JOHN'S CA DRIVERS LIC #:
JANE'S SOCIAL SECURITY #: JANE'S BIRTHDATE: JANE'S CA DRIVERS LIC #:

PROTOTYPE

☐ BY CHECKING THIS BOX, I CERTIFY THAT I AM AT LEAST 18 YEARS OF AGE, ACKNOWLEDGE THAT I HAVE READ AND ACCEPTED THE TERMS AND CONDITIONS, BETWEEN MYSELF AND MYHOMEDEFENDER.

SUBMIT

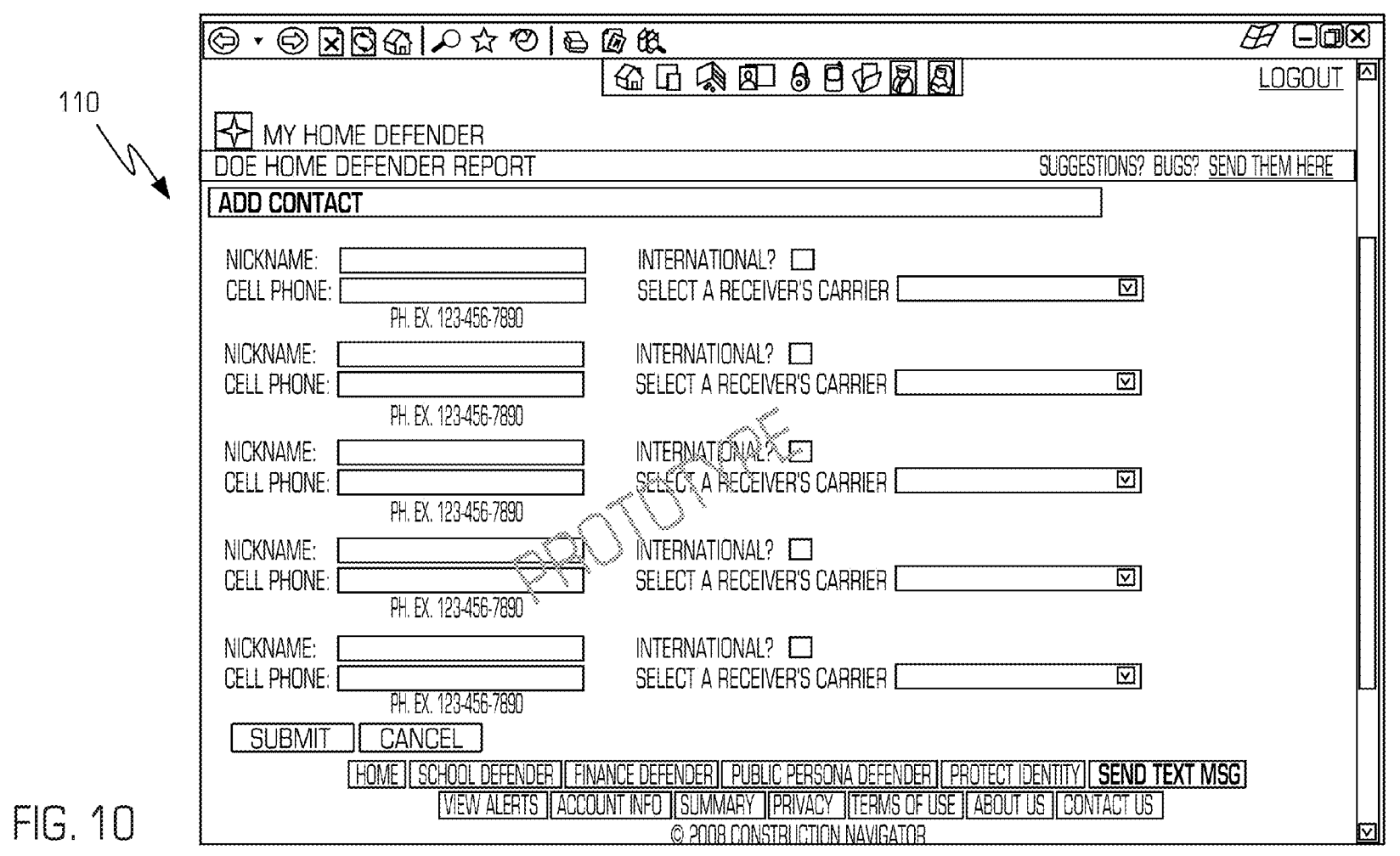

MY HOME DEFENDER
LOGOUT
DOE HOME DEFENDER REPORT
SUGGESTIONS? BUGS? SEND THEM HERE
ADD CONTACT

NICKNAME:
CELL PHONE:
PH. EX. 123-456-7890
INTERNATIONAL?
SELECT A RECEIVER'S CARRIER

NICKNAME:
CELL PHONE:
PH. EX. 123-456-7890
INTERNATIONAL?
SELECT A RECEIVER'S CARRIER

NICKNAME:
CELL PHONE:
PH. EX. 123-456-7890
INTERNATIONAL?
SELECT A RECEIVER'S CARRIER

NICKNAME:
CELL PHONE:
PH. EX. 123-456-7890
INTERNATIONAL?
SELECT A RECEIVER'S CARRIER

NICKNAME:
CELL PHONE:
PH. EX. 123-456-7890
INTERNATIONAL?
SELECT A RECEIVER'S CARRIER

SUBMIT
CANCEL

HOME | SCHOOL DEFENDER | FINANCE DEFENDER | PUBLIC PERSONA DEFENDER | PROTECT IDENTITY | SEND TEXT MSG
VIEW ALERTS | ACCOUNT INFO | SUMMARY | PRIVACY | TERMS OF USE | ABOUT US | CONTACT US

© 2008 CONSTRUCTION NAVIGATOR

FIG. 10

PERSONAL ALERT SYSTEM AND METHOD

PRIORITY CLAIMS/RELATED APPLICATIONS

This application claims the benefit under 35 USC 119(e) and priority under 35 USC 120 to U.S. Provisional Patent Application No. 61/172,938, filed on Apr. 27, 2009 and entitled "Personal Alert System and Method", the entirety of which is incorporated herein by reference.

FIELD

The system and method relate generally to a system and method for providing preselected alerts to a user based on various public sources.

BACKGROUND

Systems and services exist that allow a user to be alerted to changes in a particular piece of data or service. For example, services exist that will alert a user when an out-of-the-ordinary transaction occurs on their credit cards, etc. that may affect their credit rating so that the user can investigate. These services are typically provided by credit reporting, credit card providers and debit card financial institutions. As another example, a bank may provide a mechanism to alert a customer if his/her balance fluctuates by more than some threshold value or when the account balance is approaching a low amount of money. In another example, a neighborhood crime monitoring service may provide a mechanism to alert a customer if a crime occurs within a short distance of the home or school. In these examples, a particular vendor, such as a bank, crime reporting company or credit reporting agency, provides alerts to the user for the vendor's particular service. However, none of the current systems and methods provide the user with alerts for a number of different aspects of the user's life and it is desirable to provide such a system. Thus, it is desirable to provide a personal alert system and method and it is to this end that the disclosure is directed.

BRIEF DESCRIPTION OF THE DRAWINGS

FIG. 3 illustrates an example of a user interface showing a neighborhood alert for a residence provided by the personal alert system;

FIG. 6 illustrates an example of a summary of the alert changes message of the personal alert system;

FIG. 7 illustrates an example of a user interface showing a finances setup screen of the personal alert system;

FIG. 8 illustrates an example of a user interface showing a public persona alert by the personal alert system;

FIG. 9 illustrates an example of a protect identity user interface of the personal alert system;

FIG. 10 illustrates a contact change user interface of the personal alert system;

DETAILED DESCRIPTION OF ONE OR MORE EMBODIMENTS

The system and method are particularly applicable to a web-based personal alert system that provides the alerts described below and it is in this context that the system and method will be described. In the implementation described below, the aspect of the individual's life for which alerts are provided may include alerts about a neighborhood of the residence of the individual, alerts about a school/schools attended by children of the individual, alerts about finances of the individual, alerts about a public persona of the individual and alerts about an identity of the individual. It will be appreciated, however, that the system and method has greater utility since the system and method can be used to provide additional alerts for additional aspects of an individual's life and it can be implemented in different manners that are within the scope of this disclosure. An implementation of the personal alert system is the website, http://myhomedefender.com, although the personal alert system is not limited to that implementation of the system. Now, a web-based implementation of the alert system and method are described.

Figure 1:
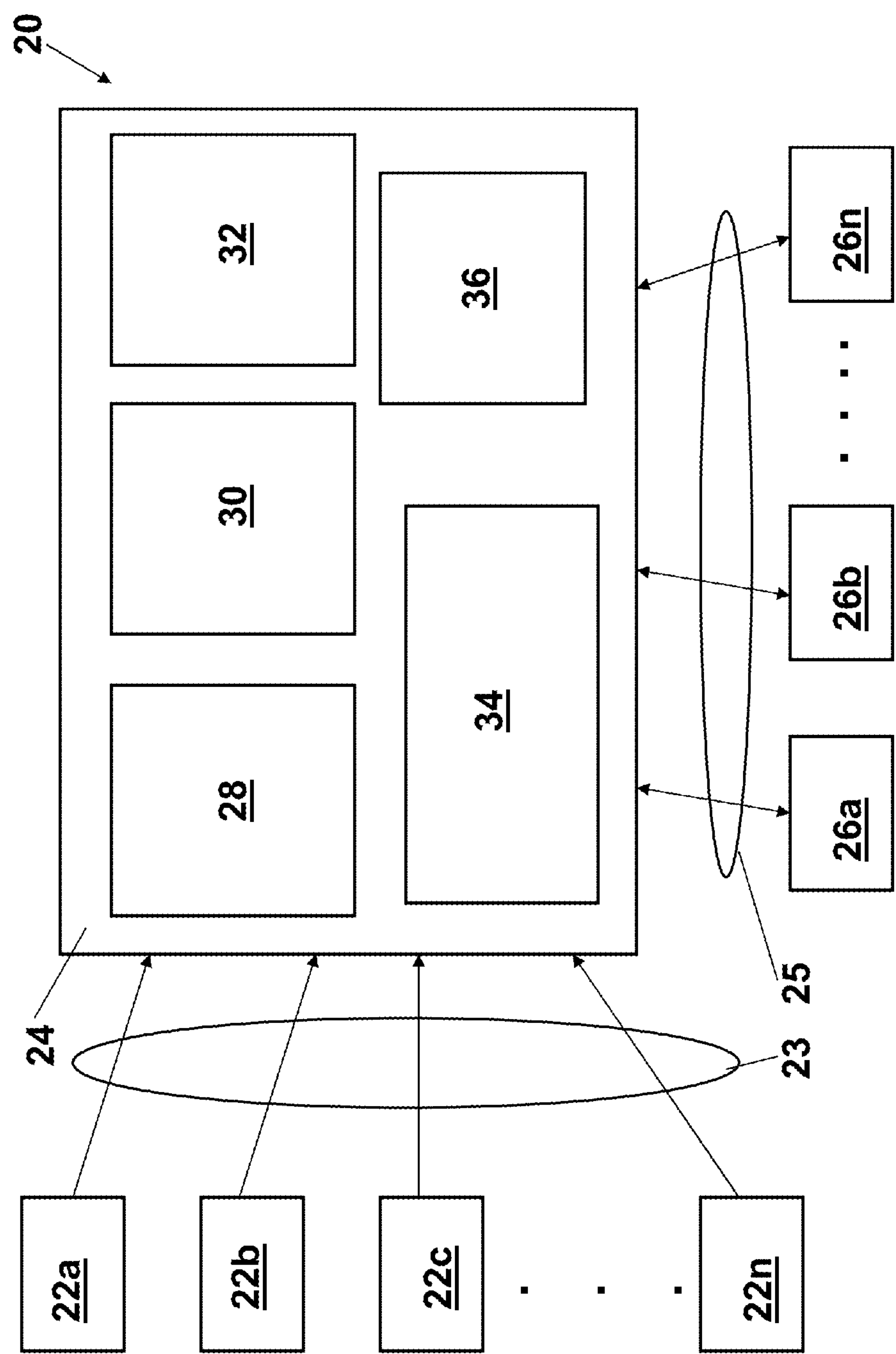
FIG. 1 illustrates a web-based implementation of an embodiment of a personal alert system.

FIG. 1 illustrates a web-based implementation of an embodiment of a personal alert system 20. The system 20 may include one or more public data sources 22 (such as 22*a*, 22*b*, 22*c*, . . . , 22*n* as shown in FIG. 1) from which public data may be extracted over a link 23 to a personal alert unit 24. The public data source may be any public source of data that can be analyzed and used to generate the alerts for a user, such as US Office of Assets and Currencies, Securities and Exchange Commission, Federal Election Commission, US House of Representative Clerk of the House, State professional licensing agencies, United States Department of Justice, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming); Department of Justice, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Department of Corrections, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Department of Prisons, County Sheriff—bookings logs & records, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Superior Court Case Information, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Superior Court for Attorneys, City Police Departments (call logs, incident reports, booking logs & records), United States Geological Service, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) County Clerk/Recorder (all official records), State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) County Tax Assessor, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) County Tax Collector, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) County Registrar of Voters, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Secretary of State, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Building Standards, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Employee Directory, County Employee Directory, City Employee Directory, City Business Licensing Databases, County Fictitious Business Licensing Database, City Building Permit Databases, County Building Permit Databases, City Building Forms Database, County Building Forms Database, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Occupation Safety & Health Administration (OSHA), FBI most wanted, CIA most wanted, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) DOJ most wanted convicts, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) County warrants, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Department of Corrections warrants, County Sheriff Retirement Agencies, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) pension group directory, Teachers pension group directory, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Sex Offenders Registry, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Superior Court, United States Supreme Court, US Department of Census, NASA employee directory, Australia Sex Offenders Registry, United Kingdom Sex Offenders Registry, United States College & University Student Directories, United States College & University Faculty Directories, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Department of Education, County Department of Education, School Districts' Faculty Directory, School Districts' team rosters, School District's boundary zones & street names, Google, Yahoo, United States Department of State, FirstGov.gov, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Vital Records, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Department of Motor Vehicles, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Department of Labor, State (Alabama, Alaska, Arizona, Arkansas, California, Colorado, Connecticut, Delaware, Florida, Georgia, Hawaii, Idaho, Illinois, Indiana, Iowa, Kansas, Kentucky, Louisiana, Maine, Maryland, Massachusetts, Michigan, Minnesota, Mississippi, Missouri, Montana, Nebraska, Nevada, New Hampshire, New Jersey, New Mexico, New York, North Carolina, North Dakota, Ohio, Oklahoma Oregon, Pennsylvania, Rhode Island, South Carolina, South Dakota, Tennessee, Texas, Utah, Vermont, Virginia, Washington, West Virginia, Wisconsin, Wyoming) Department of Work, United States Postal Service, United States Federal Trade Commission, United States Social Security Administration, United States Office of the Inspector General, AnnualCreditReport.com, online print media, weather.com. The link 23 may be a wired or wireless link such as an Ethernet link, a LAN, WLAN, computer network, the Internet, a cellular network, a digital data wireless network and the like. One or more computing devices 26 (such as 26*a*, 26*b*, . . . , 26*n* as shown in FIG. 1) may be capable of connecting to the unit 24 over a link 25 in order to, among other things, configure the personal alert unit for a particular user, submit information to the personal alert unit for a particular user and/or receive alerts for a particular user from the unit 24. Each computing device 26 may be a processing unit based device with sufficient memory, processing power and connectivity to connect with and interchange information with the unit 24. For example, each computing device may be a personal computer (laptop or desktop), a mobile device, a wireless email device (such as the Blackberry products or an Apple iPhone), a cellular phone device, a terminal device and the like. In order to receive the web pages of the personal alert unit 24 as described below, each computing device may execute an application of the processing unit of the computing device to receive and display the web pages, such as a browser application. The link 25 may be the same types of links listed about for link 23 and, in some embodiments; the link 25 may be the same link as link 23.

The personal alert unit 24 may be implemented as one or more known server computers that execute a plurality of lines of computer code to implement the functions and operations of the personal alert unit as described below, but may also be implemented in hardware, etc. The personal alert unit 24 may further comprise a web server 28 (implemented using a plurality of lines of computer code in one embodiment as a software based web server) that establishes connections with the one or more computing devices 26 over the link 25 using various known protocols such as HTTP or SHTTP and serves web pages to the computing devices that request information from the user of the computing device or provide information to the user of the computing device. The personal alert unit 24 may also comprise an analysis engine 30 (implemented as using a plurality of lines of computer code in one embodiment) that analyzes the incoming data from the data sources 22 and stores the data in a store 34 that may be implemented as a software based database system or a hardware storage system. The personal alert unit 24 may further comprise an alert engine 32 (implemented as using a plurality of lines of computer code in one embodiment) that generates the alert information (based on the data in the store 34) and formats the alert information that is sent back to the computing devices and can be configured by each user of the personal alert unit. The personal alert unit 24 may further comprise an ad/marketing engine 36 (implemented as using a plurality of lines of computer code in one embodiment) that generates targeted advertising and marketing based on the data from the data sources 22 and the alerts being generated by the system as described below in more detail. In operation, the personal alert system 20 allows a plurality of users, using the computing devices 26, to configure their personal alerts and then receive various alerts either by viewing a web page or by messaging of various forms (emails, text messages, automated phone calls, etc.) based on the public data from the data sources 22. The system 20 may also receive data from private data sources 22, such as a bank of a user, so that the personal alert system 20 may also provide financial alerts to the user based on the public data sources and the private data sources. Now, the various alerts that can be provided to a user using the personal alert are described.

Figure 2:
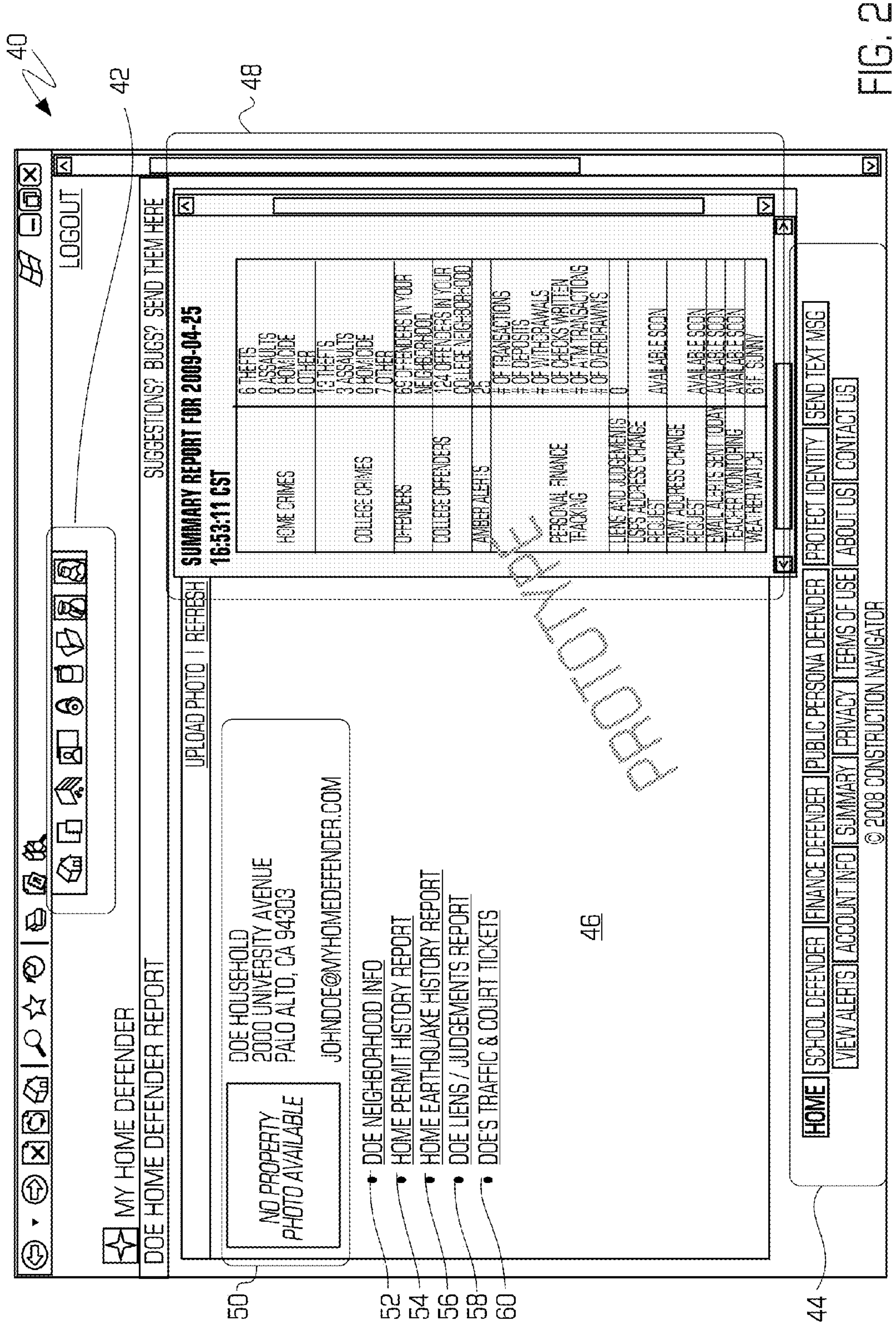
FIG. 2 illustrates an example of a user interface showing a home defender report of the personal alert system.

FIG. 2 illustrates an example of a user interface showing a home defender report 40 of the personal alert system that generates alerts based on the location of the residence of the user as well as other alerts associated with the residence. The report includes a set of icons 42 at the top of the user interface that allows a user, using a mouse to browse through the alerts and systems provided. The user may also select a tab 44 at the bottom of the user interface to select a particular alert system or unit including a school defender unit that is described below with reference to FIG. 5, a finance defender system that is described below with reference to FIG. 7, a public persona unit that is described below with reference to FIG. 8, a protect identity system that is described below with reference to FIG. 9, a send message system that is described below with reference to FIG. 10, a view alerts unit that shows the alerts as shown in FIG. 6 and an account info system that allows the user to changes his/her user settings and preferences of the alerts to be provided to the particular user.

The user interface 40 may also have a first portion 46 that displays various reports as described below and a second portion 48 that displays an alert summary that is also sent to the user via the user-selected delivery method (email, text message, etc. . . . ) The first portion 46 may further comprise a user information portion 50 that displays various information about the particular user of the system such as the residence of the user. The first portion may also have a link to a neighborhood info alert report 52 described below with reference to FIG. 3 in more detail, a home permit alert report 54 that, based on publicly available information about permits, lists the permits that are associated with the residence, a home earthquake history alert report 56 that, based on publicly available historical information about earthquakes, lists the earthquake events that are near the residence, a liens/judgments alert report 58 that, based on publicly available information about liens and judgments, lists the liens and judgments that are lodged against the residence and a traffic and court tickets alert report 60 that, based on publicly available information about traffic and court tickets, lists the traffic and court tickets for the people associated with the residence as determined by the people selected by the user. For example, a user who is a parent may list her daughter as a person associated with the residence and will therefore see anytime that the daughter receives a traffic or court ticket.

FIG. 3 illustrates an example of a user interface showing a neighborhood alert 52 for a residence provided by the personal alert system. The neighborhood alert shows each house/residence/business/office (structure) near the residence of the user and shows various public information about each owner of the neighborhood structure. For example, as shown in FIG. 3, the neighborhood alert 52 may show whether or not the owner is a donor (to a political campaign), whether the owner has an arrest record, whether the owner is a registered sex offender, the address of the neighborhood structure and whether or not the particular neighborhood structure is in foreclosure. Now, the residence/school defender alert system/module is described in more detail.

Figure 4:
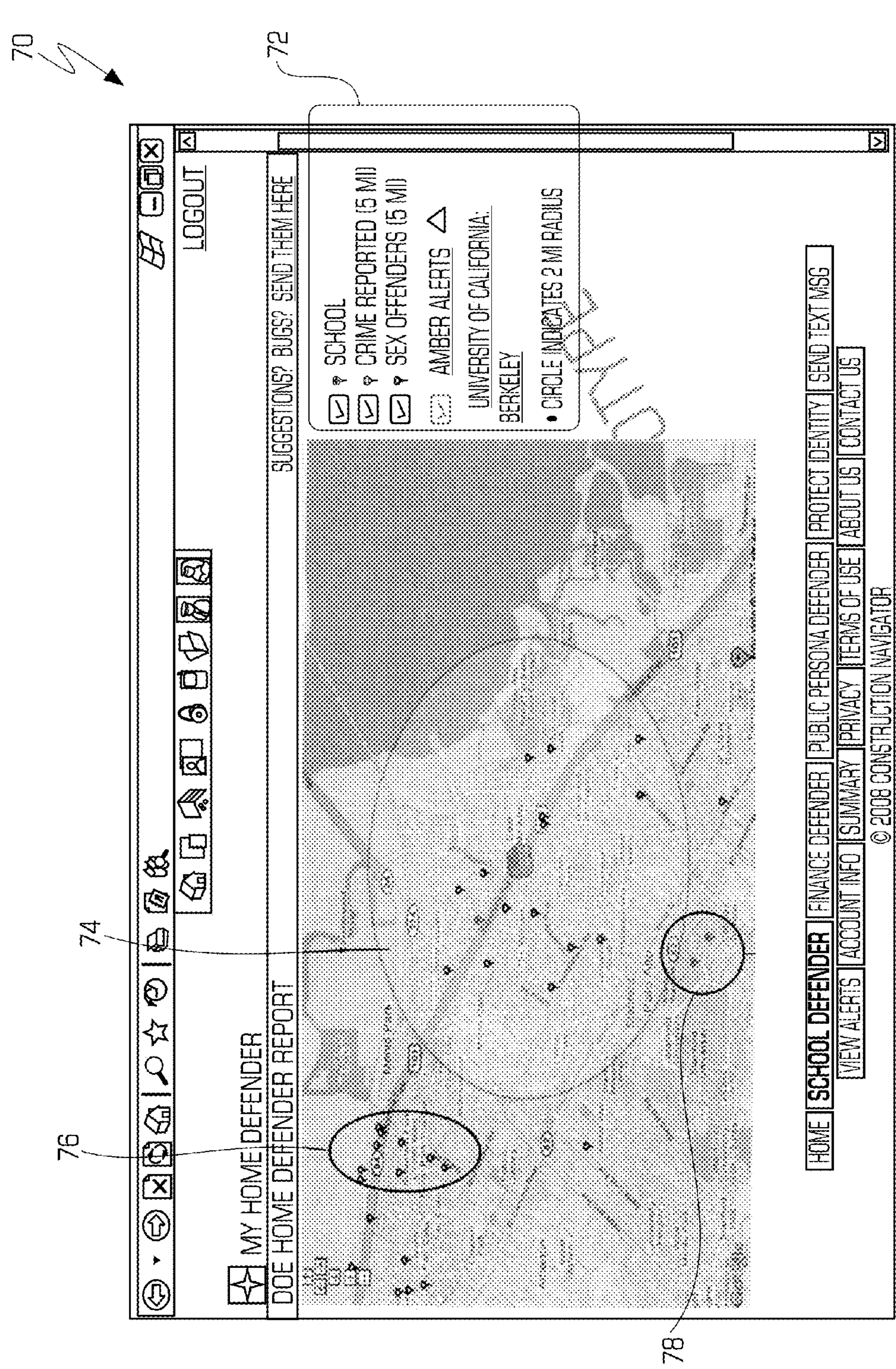
FIG. 4 illustrates an example of a user interface showing a residence event alert provided by the personal alert system.
Figure 5:
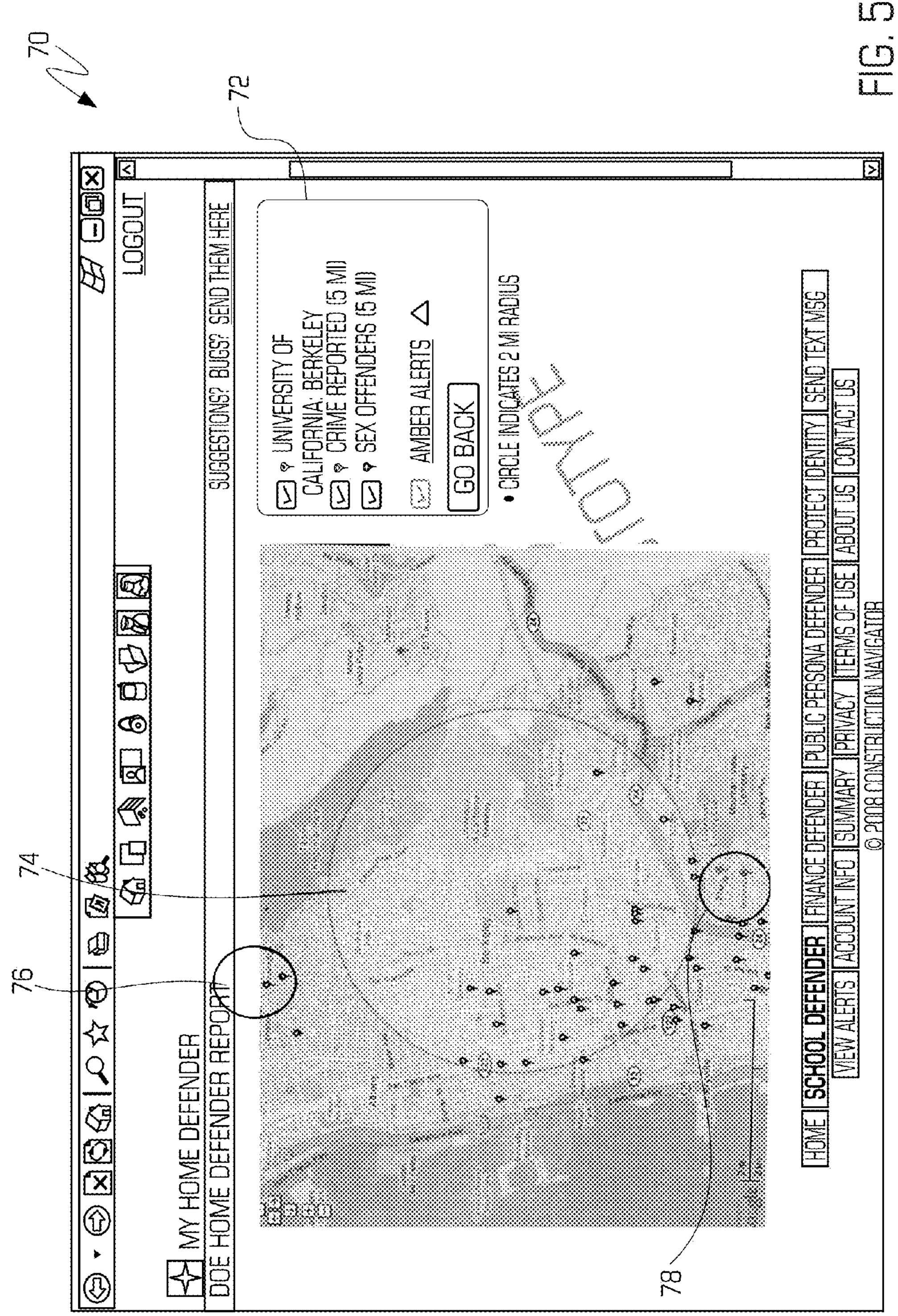
FIG. 5 illustrates an example of a user interface showing a school alert provided by the personal alert system.

FIG. 4 illustrates an example of a user interface 70 showing a residence event alert provided by the personal alert system and FIG. 5 illustrates an example of a user interface 70 showing a school alert provided by the personal alert system. In both user interfaces, a control portion 72 is used to control a map 74 that displays an area surrounding the residence (FIG. 4) or the school selected (FIG. 5). The control portion 72 allows the users to select to add icons, such as pins (as shown in FIGS. 4 and 5) that show events adjacent the residence of school. For example, the events may be the location of sex offenders 76 near the residence or school (based on publicly available information about the location of sex offenders and crimes in a particular 5 area) and/or the location of reported crimes 78 (based on publicly available information about the location of sex offenders and crimes in a particular area) near the residence or school. If the user hovers over a particular icon, additional information about the sex offender or the reported crime is shown to the user. Similarly to most of the alerts generated by the personal alert system, the system may pull data from the data sources 22 (both public data sources and private data sources) a predetermined number or times per day and then update the events shown in the neighborhood alert. For example, the personal alert system may pull data from the various data sources four times per day and then update the neighborhood alerts. The system is not limited to the events shown in FIGS. 4 and 5 and additional events can be added to the system. Thus, using these alerts shown in FIGS. 4 and 5, the user of the system can, from any computer with internet access and a browser, view various events around a residence or school.

As shown in FIG. 2, the user may select "View Alerts" unit that displays a summary of the alerts of the system such as shown in FIG. 6. A similar summary is also shown in the home defender report as shown in FIG. 2. In the example shown in FIG. 6, the events may include home crimes (with the number of different types of crimes shown), college crimes (with the number of different types of crimes shown), how many offenders may be in the neighborhood of the residence of the user or the college of user or user's child, a number of Amber alerts, a personal finance tracking alerts, liens and judgments against the residence, US postal service address change requests (indicating that someone might be trying to steal an identity if the user is unaware of the change of address), a DMV address change requests (indicating that someone might be trying to steal an identity if the user is unaware of the change of address), a number of email alerts sent to the user today (based on the user's preferences) and a weather watch for the weather in the area of the residence. In addition to the alerts summary shown in FIG. 6, the system may also send the summary via message to the user at a particular time each day (such as 6 PM depending on the user preferences). The message may be an email, a text message, a facsimile message and the like.

FIG. 7 illustrates an example of a user interface 80 showing a finances setup screen of the personal alert system. The screen shown allows the user to configure the personal finance alerts and provide the bank name, username and password so that the system can automatically obtain information from the bank. The bank then becomes one of the private data sources 22 from which the system extracts data. Once the personal financial alert system is configured, the personal finance alert system may generate an alert when an event occurs that the user would like to be alerted to. For example, when the balance in an account goes below a threshold value (such as $1000) and/or changes by more than a threshold amount, the personal finance alert may generate an alert. Another example, when there are an excessive amount of low charges less than $10 which may indicate fraudulent attempts on the account for purpose of determining a balance.

FIG. 8 illustrates an example of a user interface 90 showing a public persona alert by the personal alert system. Using data from public data sources, the system identifies mentions of the people associated with the user of the system, such as John Doe, Sunny Doe, Junior Doe and Baby Doe, in different public data exchange systems, such as the web, Facebook, Myspace, Linkedln and the local paper as shown in FIG. 8. This alert allows the user to check the number of times their names are mentioned and then possibly identify a spike in the number of mentions of the user's name when it was not expected.

FIG. 9 illustrates an example of a protect identity user interface 100 of the personal alert system that assists the user in protecting their identity that may include freezing credit access, protecting identity, stopping junk mail, getting a credit report or/and signing up for a "do not call registry."

Figure 11:
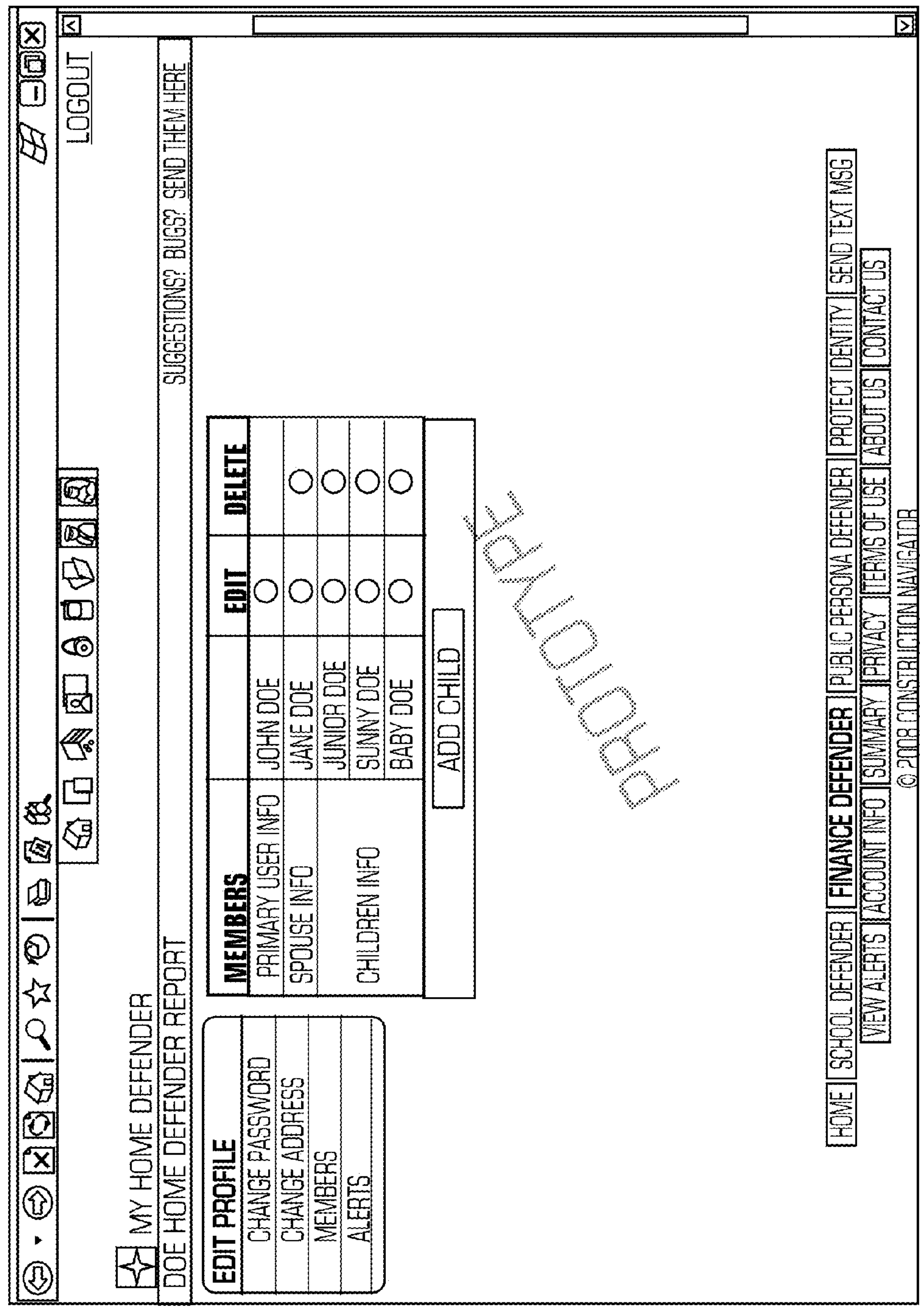
FIG. 11 illustrates a edit user profile user interface of the personal alert system.

FIG. 10 illustrates a contact change user interface 110 of the personal alert system. The user interface 110 allows a new person associated with the system to be identified along with the cell phone of the person so that they can be contacted by the system. FIG. 11 illustrates an edit user profile user interface 120 of the personal alert system that allows the authorized user (the user who has the user name and password for the system) to add, edit and delete persons associated with the user. In addition, a user can select the type of messages to be delivered to them for the summary or when an immediate alert is sent by the system, such as by the personal finance alert system.

Figure 12:
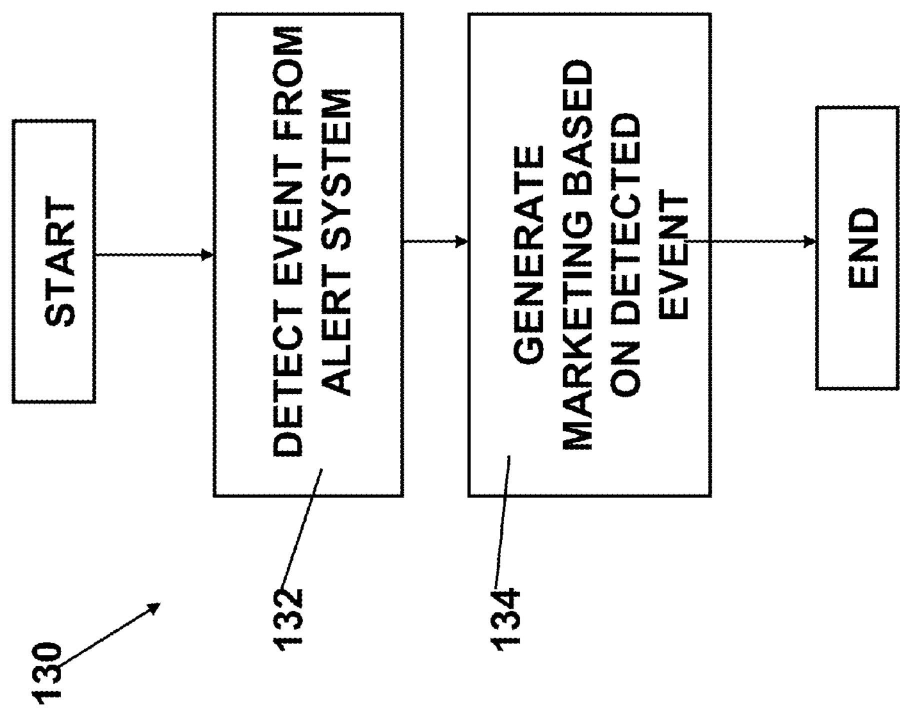
FIG. 12 illustrates a method for event based marketing using the personal alert system.

FIG. 12 illustrates a method 130 for event based marketing using the personal alert system. In particular, the system may detect events from the alert system (132) as described above. The system (the ad engine in particular), may then generate marketing (134) based on the detected events near a user's residence or school. Alternatively, the system may sell the detected event information to a third party who can market to the user. For example, if the number of thefts in an area starts to increase, the system detects those thefts and may market (or have a third party market) alarm systems into the area in which the thefts occurred.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system for personal alerts, comprising:

one or more public data sources containing public data about a plurality of people, a plurality of residences and a plurality of events;

one or more private data sources containing private data for a particular user of the personal alert system;

a personal alert unit that receives one or more pieces of data about a user of the personal alert system wherein the one or more pieces of data about the user further comprises a location of a residence of the user; and wherein the personal alert unit further comprises an analysis engine that analyzes the data from the one or more public data sources and the one or more private data sources and stores the analyzed data in a store and an alert engine that generates one or more alerts to the user based on the one or more pieces of data about a user and the analyzed data, further wherein the one or more public data sources further comprises one or more public data exchange systems and wherein the one or more arts further comprises a public persona alert that displays an occurrence of a name of the user on the one or more public data exchange systems.

2. The system of claim 1, wherein the one or more alerts further comprises a residence alert that displays events near the location of the residence of the user.

3. The system of claim 2, wherein the events are crimes.

4. The system of claim 2, wherein the events are one or more location of a sex offender near the location of the residence of the user.

5. The system of claim 1, wherein the one or more pieces of data about the user further comprise one or more schools associated with the user and wherein the one or more alerts further comprises a school alert that displays events near a location of the school associated with the user.

6. The system of claim 5, wherein the events are crimes.

7. The system of claim 5, wherein the events are one or more locations of a sex offender near the location of the residence of the user.

8. The system of claim 1, wherein the one or more private data sources further comprises a bank associated with the user and wherein the one or more alerts further comprises a finance alert that displays events that occur at the bank associated with the user.

9. A method for personal alerts, the method comprising:

receiving, from one or more public data sources, public data about a plurality of people, a plurality of residences and a plurality of events;

receiving, from one or more private data sources, private data for a particular user of the personal alert system;

analyzing the data from the one or more public data sources and the one or more private data sources to generate analyzed data that is stored in a store; and generating one or more alerts to the user based on the one or more pieces of data about a user and the analyzed data wherein the one or more public data sources further comprises one or more public data exchange systems and wherein generating one or more alerts further comprises generating a public persona alert that displays an occurrence of a name of the user on the one or more public data exchange systems.

10. The method of claim 9, wherein generating one or more alerts further comprises generating a residence alert that displays events near the location of the residence of the user.

11. The method of claim 10, wherein the events are crimes.

12. The method of claim 10, wherein the events are one or more locations of a sex offender near the location of the residence of the user.

13. The method of claim 9, wherein the one or more pieces of data about the user further comprise one or more schools associated with the user and wherein generating one or more alerts further comprises generating a school alert that displays events near a location of the school associated with the user.

14. The method of claim 13, wherein the events are crimes.

15. The method of claim 13, wherein the events are one or more locations of a sex offender near the location of the residence of the user.

16. The method of claim 9, wherein the one or more private data sources further comprises a bank associated with the user and wherein generating one or more alerts further comprises generating a finance alert that displays events that occur at the bank associated with the user.

* * * * *